United States Patent
Okamoto et al.

(10) Patent No.: US 7,149,327 B2
(45) Date of Patent: Dec. 12, 2006

(54) IMAGE PROCESSING APPARATUS AND METHOD

(75) Inventors: Yasukazu Okamoto, Hyogo-ken (JP); Nobuyuki Takeda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 839 days.

(21) Appl. No.: 10/391,626

(22) Filed: Mar. 20, 2003

(65) Prior Publication Data
US 2003/0185421 A1    Oct. 2, 2003

(30) Foreign Application Priority Data
Mar. 28, 2002    (JP)    .............................. 2002-092980

(51) Int. Cl.
G06K 9/00    (2006.01)
G06K 9/32    (2006.01)
G08G 1/01    (2006.01)

(52) U.S. Cl. ....................... 382/104; 382/294; 340/939

(58) Field of Classification Search ................ 382/104, 382/154, 190, 294; 340/937, 939; 348/118
See application file for complete search history.

(56) References Cited

U.S. PATENT DOCUMENTS

| 6,385,334 | B1 * | 5/2002 | Saneyoshi et al. | 382/154 |
| 6,535,114 | B1 * | 3/2003 | Suzuki et al. | 340/435 |
| 6,577,952 | B1 * | 6/2003 | Geier et al. | 701/214 |
| 6,985,619 | B1 * | 1/2006 | Seta et al. | 382/154 |

FOREIGN PATENT DOCUMENTS

| JP | 2001-76128 | 3/2001 |
| JP | 2001-243456 | 9/2001 |
| JP | 2001243456 A * | 9/2001 |

OTHER PUBLICATIONS

Zomet et al., "Omni-Rig: Linear Self-calibration of a Rig with Varying Internal and External Parameters," Proceedings 5th IEEE International Conference on Computer Vision, Jul. 7-14, 2001, vol. 1, pp. 135-141.*
U.S. Appl. No. 09/779,619, filed Feb. 9, 2001, Takeda et al.
U.S. Appl. No. 10/391,626, filed Mar. 20, 2003, Okamoto et al.

* cited by examiner

Primary Examiner—Jingge Wu
Assistant Examiner—Yubin Hung
(74) Attorney, Agent, or Firm—Oblon, Spivak, McClelland, Maier & Neustadt, P.C.

(57) ABSTRACT

Image processing apparatus transforms an input image from a first camera by using a parameter of affine transformation based on a position of a second camera. The first camera and the second camera are loaded onto a vehicle respectively and input an image of a road plane in time series. A status prediction unit predicts a temporary status information of the vehicle of timing (t) by using a status information of the vehicle of timing (t−1). A parallel moving vector estimation unit estimates a parallel moving vector of timing (t) included in the parameter of affine transformation by using an input image of timing (t) from the first camera, an input image of timing (t) from the second camera, and the temporary status information. A status estimation unit estimates a status information of the vehicle of timing (t) by using the parallel moving vector and the temporary status information.

20 Claims, 8 Drawing Sheets

IMAGE PROCESSING APPARATUS AND METHOD

CROSS-REFERENCE TO RELATED APPLICATIONS

This application is based upon and claims the benefit of priority from the prior Japanese Patent Application P2002-092980, filed on Mar. 28, 2002; the entire contents of which are incorporated herein by reference.

FIELD OF THE INVENTION

The present invention relates to an image processing apparatus and a method for estimating a transformation parameter used for transforming an input image in order to detect an obstacle object on a road.

BACKGROUND OF THE INVENTION

A technique to detect an obstacle is classified into a first one using a laser or a supersonic wave and a second one using a TV camera. In the first one, the laser can be expensive and resolution of the supersonic wave may be low. Accordingly, accuracy to detect the obstacle may become a problem. Furthermore, an active sensor using the laser or the supersonic wave cannot independently recognize a traveling lane.

On the other hand, in the second one, the TV camera is relatively cheap and suitable for obstacle detection from the viewpoint of resolution, measurement accuracy and measurement-limit. Furthermore, recognition of the traveling lane is possible. In case of using the TV camera, there is a method using one camera and another method using a plurality of cameras (stereo camera). In the method using one camera, a road area and an obstacle area are separated from an input image through the one camera according to information such as intensity, a color or a texture. For example, the road area is detected by extracting an intensity area of low brightness (gray area) from the image. Furthermore, the road area is detected by extracting an area of few textures from the image, and the other area is detected as the obstacle area. However, many obstacles having the intensity, the color or the texture similar to the road exist. Accordingly, it may be impossible to separate the obstacle area from the road area by this method.

In another method using a plurality of cameras, the obstacle area is detected according to three-dimensional information. In general, this method is called "stereo view". In the stereo view, for example, two cameras are located at the left side and the right side of a vehicle along a moving direction on a road plane. The same point is projected onto the left image and the right image in three-dimensional space. A three-dimensional position of the same point is calculated by a triangulation method. If a position and a direction of each camera for the road plane are previously calculated, a height from the road plane of arbitrary point on the image can be detected by the stereo view. In this way, the obstacle area and the road area can be separated by the height. In the stereo view, a problem in the case using one camera can be avoided.

However, in ordinary stereo view, a problem exists when searching for the corresponding point. In general, the stereo view is a technique to detect a three-dimensional position of an arbitrary point on the image based on a coordinate system fixed to a stereo camera (The coordinate system is called a "world coordinate system"). The search for the corresponding point means a search calculation necessary to correspond the same point in space between the left image and the right image. Because the calculation cost is extremely high, a problem exists. The search for the corresponding point is a factor to prevent realization of stereo view.

On the other hand, another method to separate the obstacle area from the road area is disclosed in Japanese Patent Disclosure (Kokai) P2001-76128 and P2001-243456. In this method, a point in one of the left image and the right image is assumed to exist in the road plane. A parameter to transform the point to a projection point on the other of the left image and the right image is included. The one image is transformed by using the parameter, and the obstacle area is separated from the road area by using a difference between the transformed image and the other image.

In certain situations, such as when a vehicle passes a road including bumps, when a loading condition of persons or a carrying condition of baggage within the vehicle changes, when the vehicle vibrates, or when the road tilts, the position and direction of the cameras (i.e., tilt of the road plane based on the vehicle) changes. Additionally, in those situations, the value of the transformation parameter also changes.

In Japanese Patent Disclosure (Kokai) P2001-76128, transformation parameter of the image is calculated using two white lines drawn on the road. However, in this method, if one white line is only viewed or the two white lines become dirty, the transformation parameter cannot be calculated.

In Japanese Patent Disclosure (Kokai) P2001-243456, a plurality of suitable directions are selected from a limit of relative location between the camera and the road plane. A transformation parameter corresponding to each of the plurality of suitable directions is then calculated. One image is transformed by using the transformation parameter, the transformed image is compared with the other image, and an area of the lowest similarity is detected as the obstacle object from the image. In this method, in case of matching the transformed image with the other image as a road plane, the area of the lowest similarity is detected. Accordingly, the obstacle object is not often detected when periodical pattern is drawn on the vehicle or a road surface is reflected by rain. In this case, the transformation parameter of the road plane is necessary.

In order to accurately detect the obstacle object, a selected transformation parameter must be within an actual transformation parameter by a sufficient accuracy. Furthermore, for example, when heavy baggage is carried on the rear part of the vehicle, the body of the vehicle often leans from the front to the rear. Briefly, transformation parameter based on event of low generation possibility is also necessary. In order to satisfy the above-mentioned two conditions, many transformation parameters are necessary. As a result, the creation of many transformed images greatly costs calculation time.

Furthermore, except for a sudden vibration by a difference in the level of the road, a change of vibration of the vehicle and a change of tilt of the road plane are slow in comparison with the input interval of a TV image, and the loading condition of persons or the carrying condition of baggage does not change during the vehicle's traveling. Accordingly, the transformation parameter of the image smoothly changes under such vibration and tilt conditions. However, in above-mentioned method, the status of the current transformation parameter is not taken into consideration, and transformed images using each of all transformation parameters are respectively prepared. As a result, a problem exists with executing useless transformations.

As mentioned-above, in the prior art, it is assumed that an input image through the TV camera includes the road plane. When an image input from one camera is transformed (projected) onto an image input from another camera, the transformation parameter is calculated using the white line. However, if the white line is not included in the image, the transformation parameter cannot be calculated.

Furthermore, in a method for preparing a large number of transformation parameters and detecting an obstacle area of the lowest similarity by comparing the transformed one image with the other image, it is necessary to prepare each transformation parameter of various events of which generation possibility is low. Creation of each transformed image greatly takes calculation time. In addition to this, the current status of the vehicle is not taken into consideration in the prepared transformation parameter. Accordingly, useless transformation is largely executed.

SUMMARY OF THE INVENTION

It is an object of the present invention to provide an image processing apparatus and a method for certainly estimating the transformation parameter to transform an input image from a first camera onto another input image from a second camera when each camera is loaded on the vehicle, even if a tilt of the road plane changes based on a status of the vehicle.

In accordance with the present invention, there is provided an image processing apparatus for transforming an input image from a first camera by using a parameter of affine transformation based on a position of a second camera. The first camera and the second camera are loaded onto a vehicle, respectively, and input an image of a road plane in time series. The apparatus comprises a status prediction unit configured to predict a temporary status information of the vehicle of timing (t) by using a status information of the vehicle of timing (t−1); a parallel moving vector estimation unit configured to estimate a parallel moving vector of timing (t) included in the parameter of affine transformation by using an input image of timing (t) from the first camera, an input image of timing (t) from the second camera, and the temporary status information; and a status estimation unit configured to estimate a status information of the vehicles of timing (t) by using the parallel moving vector and the temporary status information.

Further in accordance with the present invention, there is also provided an image processing method for transforming on input image from a first camera by using a parameter of affine transformation based on a position of a second camera. The first camera and the second camera are loaded onto a vehicle respectively input an image of a road plane in the series. The method comprises predicting a temporary status information of the vehicle of timing (t) by using a status information of the vehicle of timing (t−1); estimating a parallel moving vector of timing (t) included in the parameter of affine transformation by an input image of timing (t) from the first camera, on input image of timing (t) from the second camera, and the temporary status information; and estimating a status information of the vehicle of timing (t) by using the parallel moving vector and the temporary status information.

Further in accordance with the present invention, there is also provided a computer program product, comprising: a computer readable program code embodied in said product for causing a computer to transform in input image from a first camera by using a parameter of affine transformation based on a position of a second camera. The first camera and the second camera are loaded onto a vehicle respectively input an image of a road plane in time series. The computer readable program code comprises a first program code to predict a temporary status information of the vehicle of timing (t) by using a status information of the vehicle of timing (t−1); a second program code to estimate a parallel moving vector of timing, (t) included in the parameter of affine transformation by using an input image of timing (t) from the first camera, an input image of timing (t) from the second camera, and the temporary status information; and a third program code to estimate a status information of the vehicle of timing (t) by using the parallel moving vector and the temporary status information.

DETAILED DESCRIPTION OF THE INVENTION

Figure 1:
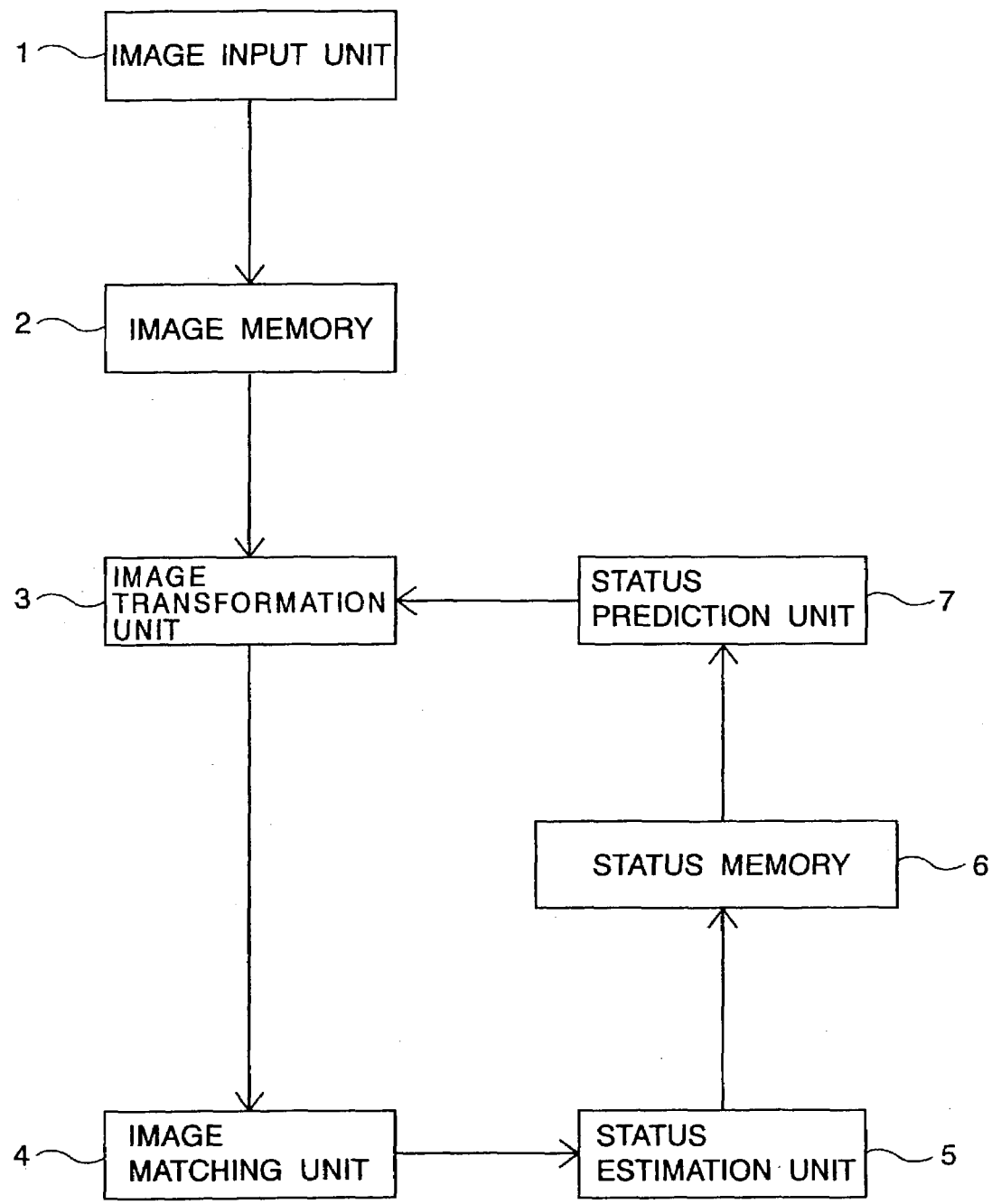
FIG. 1 is a block diagram of an image processing apparatus according to one embodiment of the present invention.

Hereinafter, various embodiments of the present invention will be explained by referring to the drawings.

In the image processing apparatus according to one embodiment of the present invention, two stereo cameras (a left side camera and a right side camera) are loaded onto the vehicle. While the vehicle is traveling on the road, the image processing apparatus is used for detecting an obstacle object, such as another vehicle or a pedestrian.

(1) Component of the Image Processing Apparatus:

FIG. 1 is a block diagram of the image processing apparatus according to one embodiment of the present invention. As shown in FIG. 1, the image processing apparatus consists of an image input unit 1, an image memory 2, an image transformation unit 3, an image matching unit 4, a status estimation unit 5, a status memory 6, and a status prediction unit 7. A function of each unit 1~7 is realized by a computer program.

The image input unit 1 inputs stereo images (a left image and a right image) of a front scene or a rear scene of the vehicle traveling on the road. The stereo images are photographed by two cameras (the left side camera and the right side camera) loaded on the vehicle. In this embodiment, as the simplest example, the left image input from the left side camera is transformed (projected) onto the right image input from the right side camera. However, the right image input from the right side camera may be transformed onto the left image input from the left side camera in other embodiments. Furthermore, if a plurality of cameras more than two units is loaded on the vehicle, another embodiment of the present invention can be applied to transformation between two camera images having a common view.

The image memory 2 stores the left image and the right image from the image input unit 1.

In the image transformation unit 3, the left image is assumed as an image of the road plane in the image memory 2, and the left image is respectively transformed using each of a plurality of transformation parameters.

In the image matching unit 4, the left image transformed by the image transformation unit 3 is compared with the right image, and the transformation parameter used for the left image of best matching is output.

In the status estimation unit 5, the status memory 6 and the status prediction unit 7, the transformation parameter selected by the image matching unit 4 is input, and a status information to estimate the present road plane is calculated using Kalman filter based on the transformation parameter. Briefly, change of geometrical relationship between the camera and the road plane by a vibration of the vehicle means a change of a tilt of the road plane based on the camera loaded on the vehicle. The status estimation unit 5, the status memory 6 and the status prediction unit 7, estimates the tilt of the road plane for the vehicle.

The status memory 6 stores the present status information of the vehicle.

The status estimation unit 5 updates the status information of the vehicle stored in the status memory 6 by using the transformation parameter output from the image matching unit 4.

In the status prediction unit 7, status information of timing (t) of new input image is predicted from the status information of previous timing (t−1) stored in the status memory 6 by using a prediction expression of Kalman filter. This predicted status information is called temporary status information. The temporary status information is output to the image transformation unit 3.

(2) The Image Transformation of the Prior Art and the Problem:

Next, the prior art and the problem are explained where one camera image is transformed based on a view position of the other camera. This is guided from geometrical relationship between the road plane and two cameras.

Figure 2:
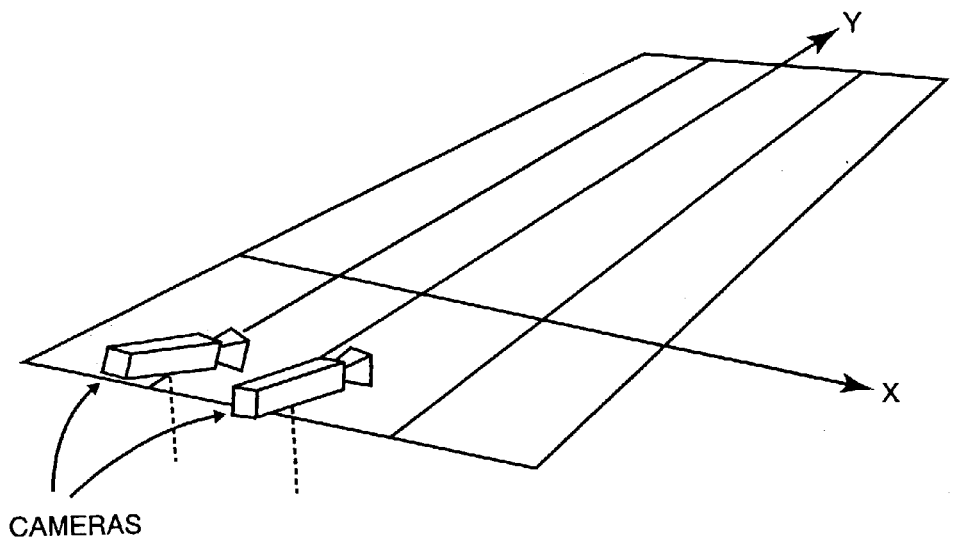
FIG. 2 is a schematic diagram of position relation between the road plane and two cameras.

First, as shown in FIG. 2, two cameras are located on the road plane. Assume that a projection coordinate of a three-dimensional point "P=(x, y, z)" onto the left image is (u, v). In general, the following expression (1) is concluded in perspective transformation.

$$u = \frac{h_{11}X + h_{12}Y + h_{13}Z + h_{14}}{h_{31}X + h_{32}Y + h_{33}Z + h_{34}}, \quad v = \frac{h_{21}X + h_{22}Y + h_{23}Z + h_{24}}{h_{31}X + h_{32}Y + h_{33}Z + h_{34}} \quad (1)$$

In one example, a position "P=(X, Y, 0)" on the road plane in which "Z=0" is supposed. Accordingly, the relationship of the projection point is represented as follows.

$$u = \frac{h_{11}X + h_{12}Y + h_{14}}{h_{31}X + h_{32}Y + h_{34}}, \quad v = \frac{h_{21}X + h_{22}Y + h_{24}}{h_{31}X + h_{32}Y + h_{34}} \quad (2)$$

In the expression (2), "$h_{11} \sim h_{34}$" are parameters determined by position and direction of the camera for world coordinate axis "XYZ", the focal distance of camera lens, and the origin of the image. A multiple of the parameters "$h_{11} \sim h_{34}$" represents the same camera model. In other words, even if one of "$h_{11} \sim h_{34}$" is set as "1", characteristic of the camera model is maintained. Accordingly, hereinafter "$h_{32}$" is set as "1".

Figure 3:
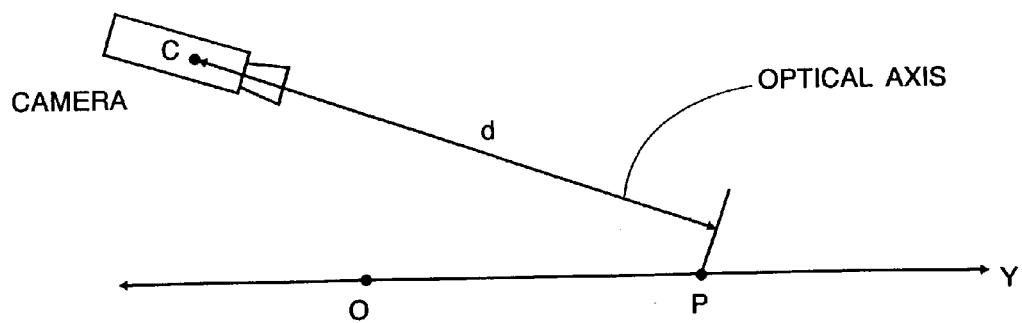
FIG. 3 is a schematic diagram of projection system of the camera onto the road plane.

As shown in FIG. 3, a denominator "$d = h_{31}X + h_{32}Y + h_{34}$" of the expression (2) represents a distance along an optical direction between the camera view position C and a road position P, i.e., a depth. In the present example apparatus of FIG. 3, the stereo camera is located in a condition that the optical axis is almost perpendicular to the X axis. In other words, the projection of the optical axis onto the road plane is parallel to the moving direction of the vehicle. Concretely, the depth d does not depend on X. Accordingly, the expression (2) is approximated in a condition that "$h_{31}=0$" as follows, $$u = \frac{h_{11}X + h_{12}Y + h_{14}}{Y + h_{34}}, \quad v = \frac{h_{21}X + h_{22}Y + h_{24}}{Y + h_{34}} \quad (3)$$

The expression (3) is represented in a condition that "Yc=Y+$h_{34}$" as follows.

$$\vec{u} = \begin{pmatrix} u \\ v \end{pmatrix} = \begin{pmatrix} h_{11}h_{14} - h_{34}h_{12} \\ h_{21}h_{24} - h_{34}h_{22} \end{pmatrix} \begin{pmatrix} \frac{X}{Yc} \\ \frac{1}{Yc} \end{pmatrix} + \begin{pmatrix} h_{12} \\ h_{22} \end{pmatrix} \quad (4)$$

When a coordinate of a vanishing point (a projection of infinite distance point as "Y=∞") is "$\vec{t} = (u_0, v_0)^T$", "$\vec{t} = (h_{12}, h_{22})^T$" is guided from the expression (4). Assuming that a matrix of the right side of the expression (4) is M and $$"\vec{X} = \left( \frac{X}{Yc}, \frac{1}{Yc} \right)^T ",$$

the following expression is concluded.

$$\vec{u} - \vec{t} = M\vec{X} \quad (5)$$

This relationship is applied to both the left image and the right image. Assuming that the projection point of the point P of the road plane onto the left image and the right image is $\vec{u}_l$, $\vec{u}_r$, the following expressions are concluded.

$$\vec{u}_l - \vec{t}_l = M_l \vec{X}, \quad \vec{u}_r - \vec{t}_r = M_r \vec{X} \quad (6)$$

$$\vec{u}_r - \vec{t}_r = A(\vec{u}_l - \vec{t}_l), \quad (A = M_r M_l^{-1}) \quad (7)$$

Accordingly, it is apparent that the left image and the right image each including the road plane are mutually related as an affine transformation.

A transformation parameter of the expression (7) is calculated by a calibration operation. Concretely, at a timing when two cameras (the left side camera and the right side camera) are loaded on the vehicle, the vehicle is located on a horizontal flat road plane and the two cameras respectively input the road plane image. A coordinate of the same point on the road plane is detected from the left image and the right image. The transformation parameter can be calculated by more than three pairs of the coordinates on the left image and the right image. In one example, by using larger number of the coordinates, a suitable parameter is calculated based on method of least squares. Furthermore, if the vehicle is located on the center of two white lines (a left side white line and a right side white line) along advance direction of the straight road, a coordinate of a vanishing point vector can be calculated using a cross point of the left side white line and the right side white line.

(3) Change of Image in a Case of Changing the Road Plane:

Next, assume that the road plane changes from "Z=0" to "Z=pY" by tilt of the road plane or vibration of the vehicle. Concretely, when the vehicle passes a road of ups and downs, when the loading condition of persons or carrying condition of baggage onto the vehicle changes, or when the vehicle vibrates or the road tilts, the relationship of position and direction between the camera of the vehicle and the road plane changes. Briefly, a tilt of the road plane based on the vehicle changes and contents of the image often change by vibration of top and bottom direction. In this case, the expression (3) of "Z=0" is represented as follows.

$$u' = \frac{h_{11}X + (h_{12} + ph_{13})Y + h_{14}}{Y + ph_{33}Y + h_{34}}, \quad v' = \frac{h_{21}X + (h_{22} + ph_{23})Y + h_{24}}{Y + ph_{33}Y + h_{34}} \quad (8)$$

When "Yc=Y+$h_{34}$", the following expression is concluded.

$$\begin{pmatrix} u' \\ v' \end{pmatrix} = \begin{pmatrix} h_{11}h_{14} - h_{34}(h_{12} + ph_{13}) \\ h_{21}h_{24} - h_{34}(h_{22} + ph_{23}) \end{pmatrix} \begin{pmatrix} \frac{X}{Y_C} \\ \frac{1}{Y_C} \end{pmatrix} + \begin{pmatrix} h_{12} + ph_{13} \\ h_{22} + ph_{23} \end{pmatrix} \quad (9)$$

Figure 4:
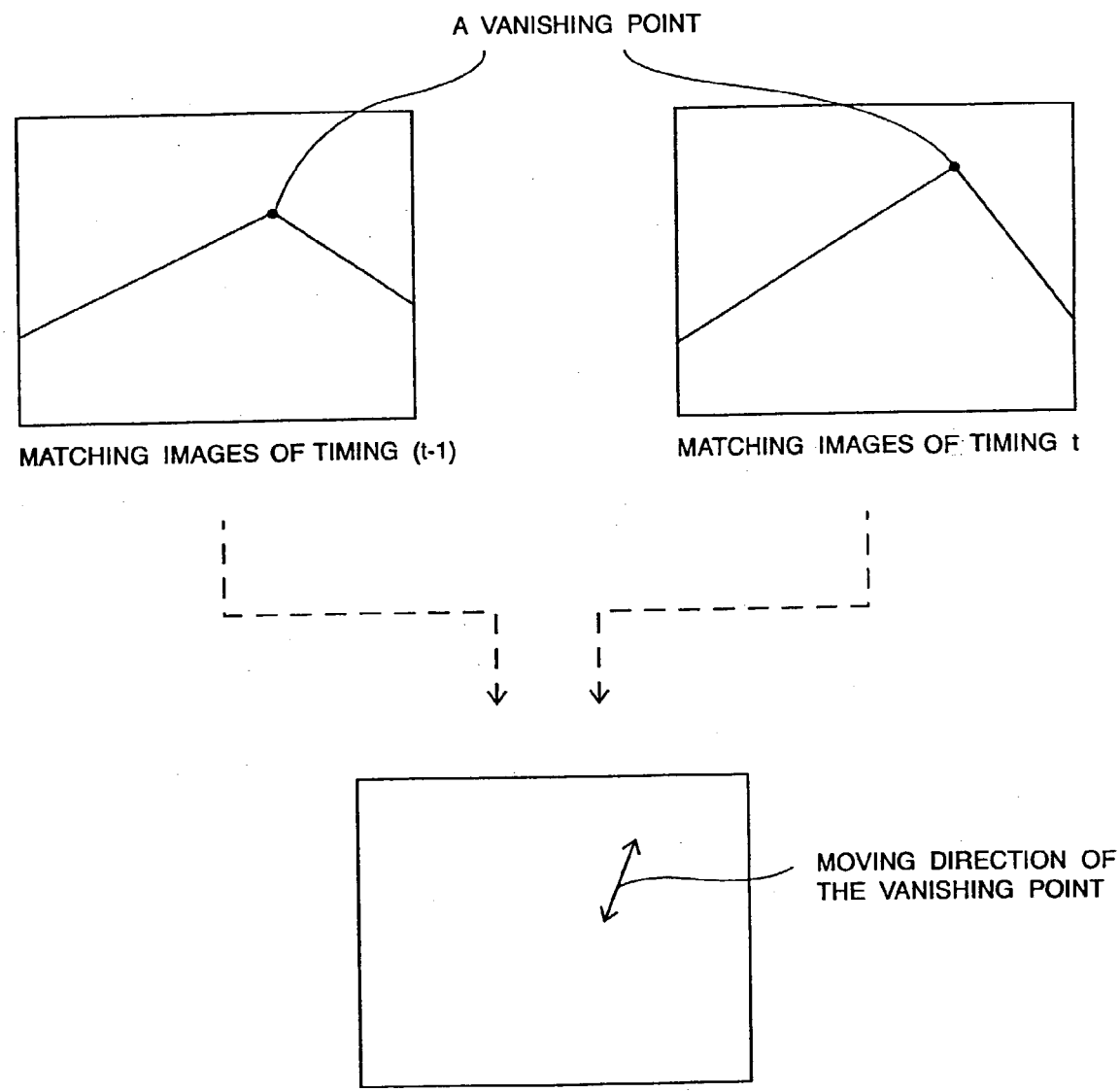
FIG. 4 is a schematic diagram of moving direction of a vanishing point based on matching images at timings (t−1) and (t).

When a coordinate of the vanishing point is "$\vec{t}\,'=(u_0',v_0')^T$", "$\vec{t}\,'=(h_{12}+ph_{13}, h_{22}+ph_{23})^T$" is concluded from the expression (9). Accordingly, as shown in FIG. 4, the vanishing point moves along a straight line by tilt of the road plane or vibration of the vehicle. Furthermore, the expression (9) is represented using the vanishing point as follows.

$$\vec{u}_r = \begin{pmatrix} u' \\ v' \end{pmatrix} = \begin{pmatrix} h_{11}h_{14} - h_{34}u_0' \\ h_{21}h_{24} - h_{34}v_0' \end{pmatrix} \begin{pmatrix} \frac{X}{Y_C} \\ \frac{1}{Y_C} \end{pmatrix} + \begin{pmatrix} u_0' \\ v_0' \end{pmatrix} \quad (10)$$

Assuming that $\Delta \vec{u} = \vec{u} - \vec{t}$, $\Delta \vec{u}\,' = \vec{u}\,' - \vec{t}\,'$, $\Delta u_0 = u_0 - u_0'$, $\Delta v_0 = v_0 - v_0'$, following expression is concluded.

$$\Delta \vec{u}_r = \begin{pmatrix} h_{11}h_{14} - h_{34}u_0 \\ h_{21}h_{24} - h_{34}v_0 \end{pmatrix} \begin{pmatrix} \frac{X}{Y_C} \\ \frac{1}{Y_C} \end{pmatrix} + \begin{pmatrix} h_{34}(u_0 - u_0') \\ h_{34}(v_0 - v_0') \end{pmatrix} \frac{1}{Y_C} \quad (11)$$

$$= M\vec{X} + h_{34} \begin{pmatrix} 0 & \Delta u_0 \\ 0 & \Delta v_0 \end{pmatrix} \vec{X}$$

$$= \Delta \vec{u}_r + h_{34} \frac{\Delta t}{Y_C}$$

Further assumptions may be made that $\vec{X} = M_{-1} \Delta \vec{u}$ and a matrix value is as follows.

$$M - 1 = \begin{pmatrix} m_{11} & m_{12} \\ m_{21} & m_{22} \end{pmatrix} \quad (12)$$

In this case, $$\frac{1}{Y_C} = m_{21}\Delta u + m_{22}\Delta v$$

is guided. Accordingly, following expression is concluded.

$$\Delta \vec{u}_r = \begin{pmatrix} 1 + h_{34}m_{21}\Delta u & h_{34}m_{22}\Delta u \\ h_{34}m_{21}u_0\Delta v & 1 + h_{34}m_{22}\Delta v \end{pmatrix} \Delta \vec{u} \quad (13)$$

In the above expression (13), if a yaw angle (rotation around vertical axis) of the vehicle is very small, $h_{34}$ is also small value. Accordingly, even if the tilt of the road or vibration of the vehicle occurs, $\Delta \vec{u}\,'$ is almost equal to $\Delta \vec{u}$, and image transformation does not occur by tilt of the road plane.

From the above-mentioned explanation of geometrical relationship between the road plane and the camera, the left image and the right image are mutually related as affine transformation. In other words, image deformation does not occur by tilt of the road or vibration of the vehicle. From this conclusion that image deformation does not occur, when the road plane changes from "Z=0" to "Z=pY", the relationship between the left image and the right image is represented as follows in the same way of the expression (7).

$$\vec{u}_r' - \vec{t}_r' = A(\vec{u}_l' - \vec{t}_l') \quad (13\text{-}A)$$

Furthermore, from the expressions (4) and (9), a position of the vanishing point changes as "$\vec{t}\,' = \vec{t} + p\vec{d}$ ($\vec{d} = (h_{13}, h_{23})^T$)" by tilt of the road plane. Accordingly, the expression (13-A) is represented as follows.

$$\vec{u}_r' - \vec{t}_r = A(\vec{u}_l' - \vec{t}_l) + p(\vec{d}_r + A\vec{d}_l) \quad (13\text{-}B)$$

From this expression (13-B), it is found that a parallel moving vector changes by tilt of the road plane and a direction of change quantity of the parallel moving vector is fixed. In this case, assume that elements changed by tilt of the road in the parallel moving vector is $(\alpha, \beta)$. From the expression (13-B), (7) and $(\alpha, \beta)$, affine transformation between the left image and the right image is represented as follows.

$$\vec{u}_r' - \vec{t}_r = A(\vec{u}_l' - \vec{t}_l) + (\alpha, \beta)^T \quad (13\text{-}C)$$

In the expression (13-C), values of constants "A, $\vec{t}_r$, $\vec{t}_l$" are previously calculated. Concretely, a vehicle is located on a horizontal road plane. Two cameras (the left side camera and the right side camera) loaded on the vehicle inputs the horizontal road plane. A position of a feature point on the road plane is corresponded between the left image and the right image. The values of constants "A, $\vec{t}_r$, $\vec{t}_l$" are calculated by a pair of coordinates of a plurality of feature points between the left image and the right image. Accordingly, affine transformation parameter for tilt of the road can be calculated by the expression (7) and (α, β)

(4) Function of the Image Transformation Unit 3:

As mentioned-above, if the road and the vehicle are horizontal, affine transformation parameter to transform the left image is calculated by a calibration operation. Furthermore, even if the road or the vehicle tilts, the affine transformed image changes in that it parallely moves along a fixed direction occurs only. Accordingly, in the image transformation unit 3, the left image is transformed from a viewpoint of the right image (the right camera) by using the transformation parameter of which parallel moving vector (α, β) variously changes. One parallel moving vector of best matching similarity is regarded as the parallel moving vector (α, β) to be searched.

The distribution of prediction value Y of the two-dimensional parallel moving vector is represented as a two-dimensional normal distribution Z(Y) using an average "$Y_{t/t-1}=(\alpha_t, \beta_t)^T$" and a prediction covariance matrix Pt as follows.

$$Z(Y) = \frac{1}{\sqrt{2\pi^2 |\hat{P}_t|}} \exp\left(-\frac{1}{2}\left(\frac{Y-Y_t}{t-1}\right)^T \hat{P}_t^{-1}\left(\frac{Y-Y_t}{t-1}\right)\right) \quad (14)$$

In the expression (14), "$Y_{t/t-1}$" is calculated by applying $h_t$ of expression (24) to a prediction value $X_{t/t-1}$ of status vector as explained later. Subscript "$_{t/t-1}$" of "$Y_{t/t-1}$" means a prediction value Y of the next timing (t) at present timing (t-1). In the same way, "$X_{t/t-1}$" and "$P_{t/t-1}$" means each prediction value.

Hereinafter, each sign of covariance matrix P, status vector X, parallel moving vector Y and two-dimensional normal distribution Z is different from each sign of the above-mentioned three-dimensional point "P=(X, Y, Z)". Furthermore, a hat sign "^" of "P̂t, F̂, Ĥ" means a prediction value.

In the image transformation unit 3, $g_i=(\alpha_i, \beta_i)$ (i=1~n) of a fixed number (n units) is selected according to a probability distribution of the expression (14). For example, "$g_i$" may be selected at random according to the probability distribution or may be selected in order by equal probability. Next, the transformation parameter is calculated by selected $g_i=(\alpha_i, \beta_i)$ and the expression (7), and the left image is transformed from a viewpoint of the right image (right side camera) by using the transformation parameter.

Figure 5:
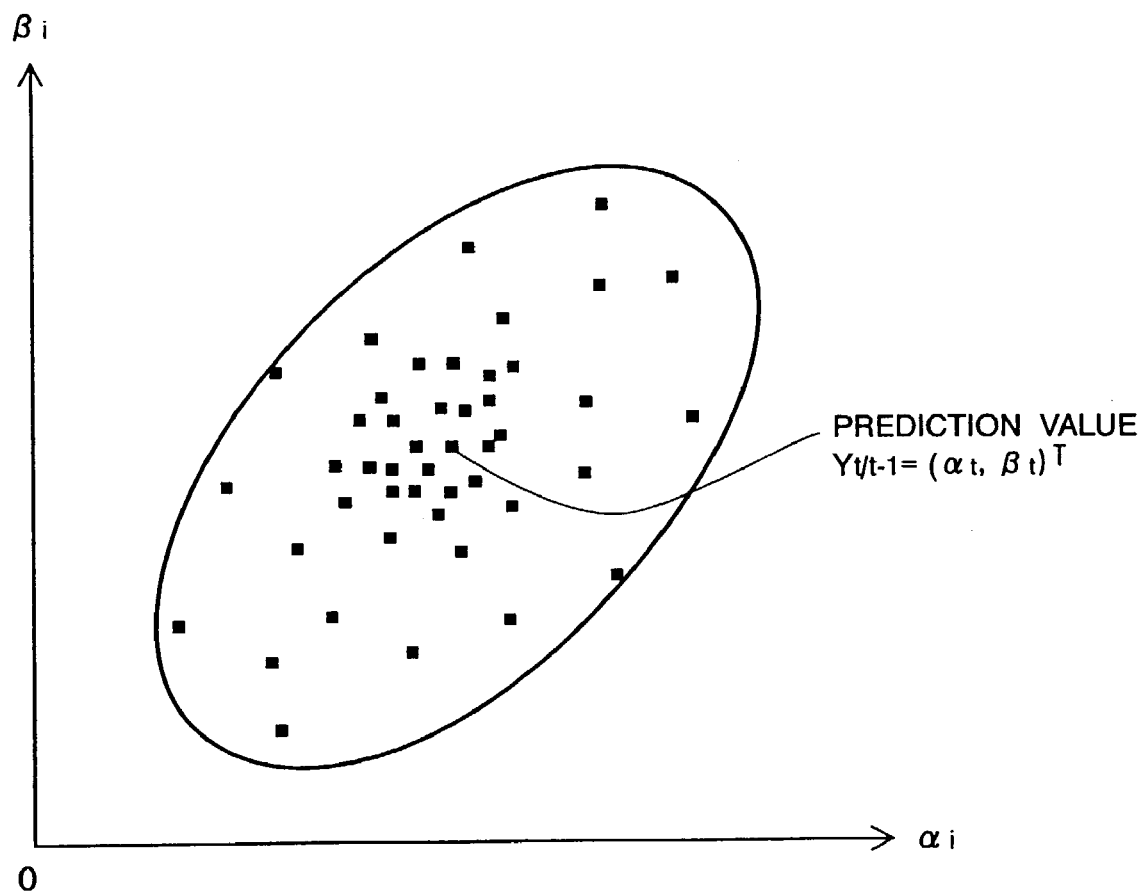
FIG. 5 is a schematic diagram of probability distribution of prediction value of parallel moving vector.

FIG. 5 shows an example of random sample (candidate values) of prediction value based on probability distribution. In FIG. 5, an ellipse is represented by a counter line linking coordinates of equal probability as a two-dimensional normal distribution. The possibility of a candidate value (random sample) in the ellipse is higher than the possibility of a candidate value outside the ellipse. If the candidate value is selected according to the probability distribution, the candidate value is densely sampled in the high probability area and the candidate value is sparsely sampled in the low probability area. Accordingly, in the high probability area, the transformation parameter can be estimated finely.

Each selected $g_i$(i=1~n) is arranged in order of nearer value from a prediction valve "$Y_{t/t-1}=(\alpha_t, \beta_t)^T$" shown in FIG. 5. The transformation parameter is calculated using each $g_i$(i=1~n) in order of arrangement. The left image is transformed using each transformation parameter in order, and each transformed image is output to the image matching unit 4. If a size of the image is small and the creation time of the transformed image is short, gi may be selected at a predetermined interval without the probability distribution of the expression (14).

(5) Function of the Image Matching Unit 4:

In the image matching unit 4, the left image transformed by the image transformation unit 3 is compared (matched) with the right image. In this case, assume that the left image is $I_l$ and the right image is $I_r$.

Figure 6:
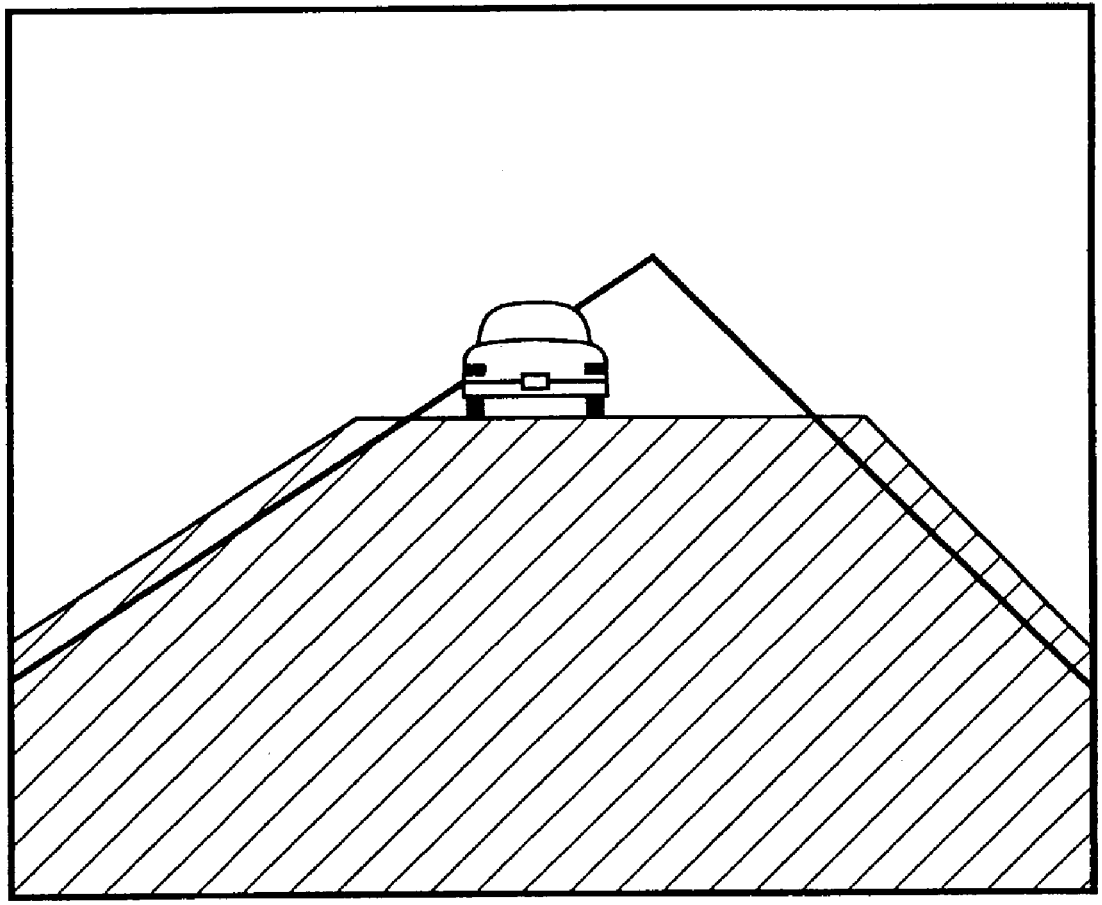
FIG. 6 is a schematic diagram of a matching area on the image.
Figure 7:
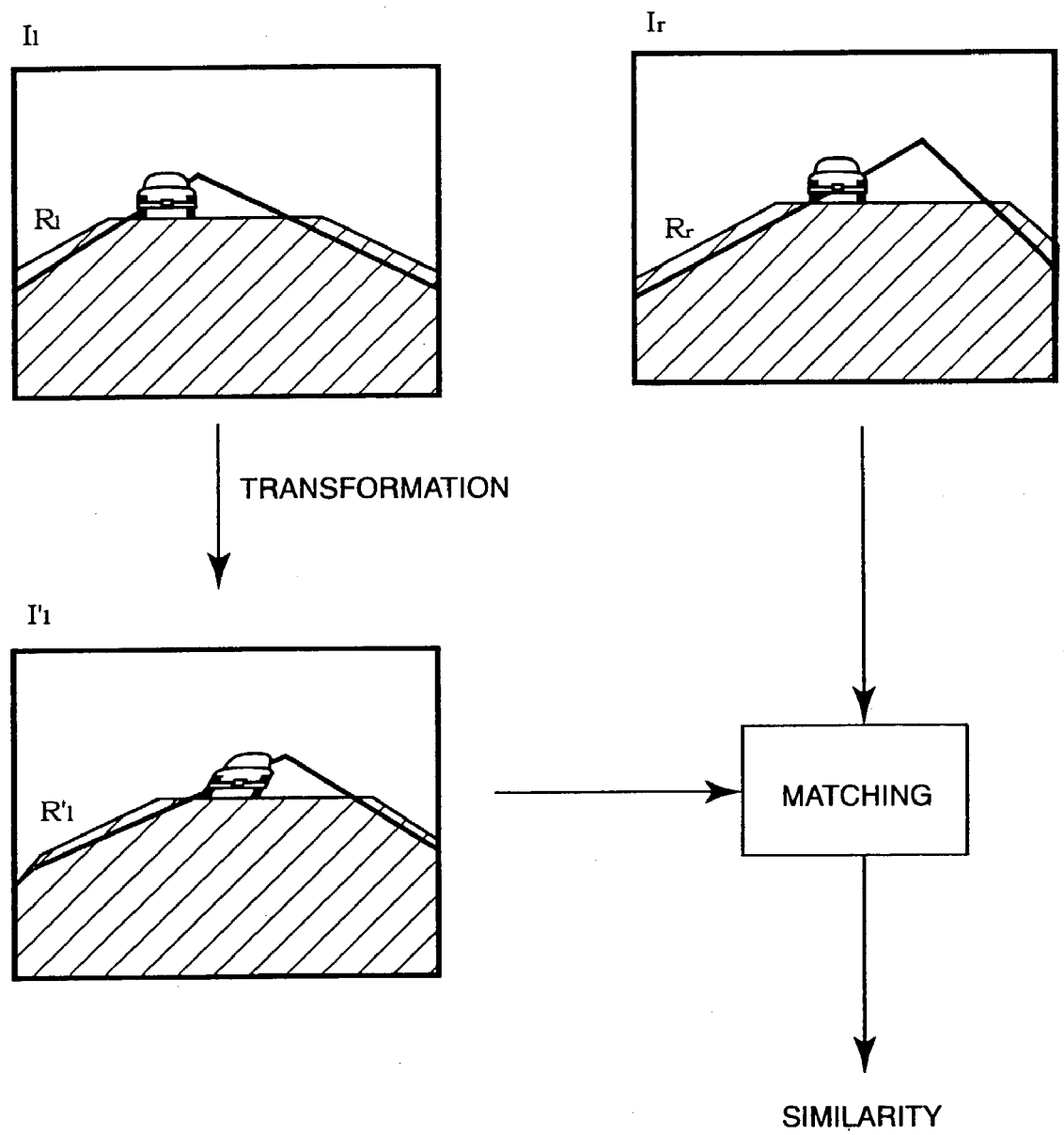
FIG. 7 is a schematic diagram of a processing step of an image matching unit according to one embodiment of the present invention.

(5-1) Creation of Matching Area:

First, an area including the most part of the road area is selected from the left image as a matching area $R_l$. The matching area may be dynamically set by using extraction result of the vehicle or the white line drawn on boundary of the road. Otherwise, as shown in FIG. 6, by the user's indication of an area including the most part of the road plane, the indicated area may be set as the matching area. In the image transformation unit 3, the matching area $R_l$ is transformed by using the transformation parameter. In an embodiment shown in FIG. 7, the left image $I_l$ is transformed by using the transformation parameter. This transformed left image is set as an image $I_l'$. The matching area $R_l$ can be transformed in the same way of the left image $I_l$. Accordingly, the transformed matching area is set as a matching area $R_l'$. Furthermore, a matching area $R_r$ is extracted from the right image $I_r$. In this embodiment, assume that pixel value of coordinate (i, j) on the transformed image $I_l'$ is $I_l'$ (i, j) and the pixel value of coordinate (i, j) on the right image $I_r$ is $I_r(i, j)$.

(5-2) Correction Based on Difference of Photograph Condition of the Left Image and the Right Image:

Even if two cameras (the left camera and the right camera) photography the same point (the-same coordinate) on the road plane, it often happens that pixel values of the same point of the left image and the right image are different due to the different photopraphic conditions of the left image and the right image. For example, if a white car is included in a view of the left image, an iris of the left camera is closed more than an iris of the right camera when using auto iris lens camera. As a result, even if the same position of the road plane is photographed by the left camera and the right camera, the brightness of the position of the left image is often lower than brightness of the position of the right image. Accordingly, the matching similarity is corrected using an average of brightness of the images $I_l'$ and $I_r$.

$$\bar{I}_{1_r} = \frac{1}{n}\sum_{(i,j)\in R_1',(i,j)\in R_r} I_1'(i,j), \bar{I}_r = \frac{1}{n}\sum_{(i,j)\in R_1',(i,j)\in R_r} I_r(i,j) \quad (15)$$

(5-3) Matching Method:

There are a plurality of matching methods using a corrected average of brightness. In this case, four example matching methods are explained.

(5-3-1) The First and Second Matching Methods:

After the left image and the right image are corrected so that a difference of the average of brightness is equal to "0", the matching evaluation value (matching similarity) is calculated as the sum of the difference of brightness. This evaluation expression is represented as follows.

$$D_1 = \sum_{(i,j) \in R'_1, (i,j) \in R_r} ((I'_1(i,j) - \bar{I}'_1) - (I_r(i,j) - \bar{I}_r)) \quad (16)$$

Otherwise, if the left image and the right image is corrected so that a ratio of the average of brightness is equal, the evaluation expression is represented as follows.

$$D_2 = \sum_{(i,j) \in R'_1, (i,j) \in R_r} \left( \frac{I'_1(i,j)}{\bar{I}'_1} - \frac{I_r(i,j)}{\bar{I}_r} \right) \quad (17)$$

If the matching evaluation value "$D_1=0$ or $D_2=0$" represents a coincidence of two images, the matching evaluation value is calculated by comparing each transformed left image using all transformation parameters with the right image. A transformation parameter of which absolute value of the matching evaluation value is smallest and a transformation parameter of which absolute value of the matching evaluation value is second smallest, are selected. Assuming that the former parameter is $W_i$, the latter parameter is $W_j$, the matching evaluation value of the parameter $W_i$ is $D_i$, and the matching evaluation valve of the parameter $W_j$ is $D_j$. In this case, the transformation parameter is determined as follows.

$$W' = \begin{cases} W_i & \text{sign}(D_i) = \text{sign}(D_j) \\ \dfrac{W_i |D_i| + W_j |D_j|}{|D_i + D_j|} & \text{sign}(D_i) \neq \text{sign}(D_j) \end{cases} \quad (18)$$

Briefly, if the sign of two evaluation values (Di and Dj) are different, a transformation parameter of which matching evaluation value is "0" is regarded as the estimated transformation parameter W'.

(5-3-2) The Third and Fourth Matching Methods:

Alternatively, the third matching method using the expression (19), or the fourth matching method using the expression (20), may be used.

$$D_3 = \sum_{(i,j) \in R'_1, (i,j) \in R_r} |(I'_1(i,j) - \bar{I}'_1) - (I_r(i,j) - \bar{I}_r)| \quad (19)$$

$$D_4 = \sum_{(i,j) \in R'_1, (i,j) \in R_r} \left| \frac{I'_1(i,j)}{\bar{I}'_1} - \frac{I_r(I,j)}{\bar{I}_r} \right| \quad (20)$$

This evaluation expression represents the sum of the absolute value of a difference of brightness of each pixel. Each matching evaluation value is a positive value. In this case, a parallel moving vector ($\alpha$, $\beta$) is selected where the matching evaluation value is smallest. While the matching evaluation value of the left image is calculated for each parallel moving vector, if a matching evaluation value of one parallel moving vector is below the minimum of the evaluation values already calculated, calculation of the evaluation value of the left image may be completed. In this case, the one parallel moving vector ($\alpha$, $\beta$) is selected.

The image transformation unit 3 creates the transformed image of each transformation parameter according to probability distribution of the expression (14). In the image matching unit 4, each transformed image created by the image transformation unit 3 is compared with the right image in order. Before this processing, the image transformation unit 3 creates a large number of transformed images by using the parallel moving vector ($\alpha$, $\beta$) near the prediction value $Y'_{t-1}$ as shown in FIG. 5. Accordingly, if the prediction does not largely miss, the parallel moving vector ($\alpha$, $\beta$) can be finitely selected. Furthermore, because each parallel moving vector is arranged in order of nearer distance from the prediction value, a probability that the matching evaluation value of the transformation parameter of earlier order is the minimum is high. Accordingly, if the evaluation expression (19) or (20) is used for calculating the matching evaluation value, a probability that the calculation of the matching evaluation value is stopped halfway is high, and the matching processing can be executed at high speed.

As mentioned-above, in the image matching unit 4, the left image is transformed by using a plurality of transformation parameter ($\alpha$, $\beta$). Each transformed image is compared with the right image, and the matching similarity is calculated for each transformation parameter. One transformation parameter ($\alpha$, $\beta$) of which the matching similarity (evaluation value) is maximum (minimum) is selected as the parallel moving vector to be searched.

(6) Function of the Status Estimation Unit 5:

the statues memory 6 and the status prediction unit 7.

In the status estimation unit 5, the status memory 6, and the status prediction unit 7, the transformation parameter (parallel moving vector) selected by the image matching unit 4 is input. The present road plane is estimated by using Kalman filter including the transformation parameter. Concretely, a tilt of the road plane is calculated and a distance from the vehicle to an obstacle object is calculated using the tilt of the road plane.

The status memory 6 stores a status vector $X_t$ and a covariance matrix $P_t$ as status information of timing (t). Briefly, the status memory 6 stores above-mentioned information of parallel moving of the image. The tilt of the road plane can be estimated using this information.

(6-1) Explanation of the Status Vector:

In one embodiment, the status vector $X_t$ consists of a unit vector "$C_x$, $C_y$," representing a parallel moving direction, a magnitude "l" of the parallel moving direction, and a change quantity "a" of the magnitude l per unit time. The status vector $X_t$ is represented as follows.

$$X_t = [C_x, C_y, l, a]^T \quad (21)$$

(6-2) Explanation of the Covariance Matrix:

In one embodiment, the covariance matrix $P_t$ is a matrix of four rows and four columns representing covariance of each element of the status vector. In this matrix, element of the i-th row and the j-th column represents a variance of the i-th element of the status vector in the case of "i=j", and represents a covariance of the i-th element and the j-th element of the status vector in the case of "i≠j". The variance represents a change in degree of the value of the element, and the covariance represents a co-change in degree of the values of two elements. Concretely, if the variance and the covariance are small values, the change in degree of the value of the status vector is small and reliability of the element is high. Conversely, if the variance and the covariance are large value, the change in degree of the value of the status vector is large and reliability of the element is low.

(6-3) Explanation of Measurement Value:

Assume that the measurement value of parallel moving vector of timing (t) obtained by the image matching unit 4 is $Y_t$. The measurement value $Y_t$ is represented as follows.

$$Y_t = [\alpha, \beta]^T \quad (22)$$

(6-4) Status Transition Function f:

Assume that vibration of the vehicle and change of tilt of the road are smooth. A status vector $X_{t+1}$ passing from the status vector $X_t$ by a unit time is represented using a status transition function f as follows.

$$X_{t+1} = f(X_t)$$

$$f(X_t) = [C_x, C_y, l+a, a]^T \quad (23)$$

(6-5) Explanation of Kalman Filter:

A Kalman filter is an algorithm to calculate a suitable value of a model parameter by applying the status transition function to a time series of data measured from the image. The relationship between the measurement value $Y_t$ and the status vector is defined as follows.

$$Y_t = h_t\left(\frac{X_t}{t-1}\right) + n_t \quad (24)$$

$$h_t(X_t) = \begin{pmatrix} C_x 1 \\ C_y 1 \end{pmatrix}$$

In this case, the Kalman filter to estimate the status vector of the vehicle is represented as follows.

$$X_{t+1/t} = f(X_{t/t}) + m_t \quad (25)$$

$$X_{t/t} = X_{t/t-1} + K_t[Y_t - h_t(\hat{X}_{t/t-1})] \quad (26)$$

$$K_t = P_{t/t-1}\hat{H}_t^T[\hat{H}_t P_{t/t-1}H_t^T + S_t]^{-1} \quad (27)$$

$$P_{t+1/t} = \hat{F}_t P_{t/t} \hat{F}_t^T + Q_t \quad (28)$$

$$P_{t/t} = P_{t/t-1} - P_{t/t-1}H_t^T[\hat{H}_t P_{t/t-1}\hat{H}_t^T + S_t]^{31\ 1}H P_{t/t-1} \quad (29)$$

In the above expressions (24) and (25), "$m_t$" and "$n_t$" are respectively a Gaussian white noise vector of average "0" representing error and a measurement error of status transition. The covariance matrix of "$m_t$" and "$n_t$" are respectively represented as "$Q_t$" and "$S_t$".

$$E\left\{\begin{pmatrix} m_t \\ n_t \end{pmatrix}[m_t^T n_t^T]\right\} = \begin{pmatrix} Q_t & 0 \\ 0 & S_t \end{pmatrix} \quad (30)$$

In above expressions (27) (28) (29), $\hat{F}_t$ is a defined matrix of "4×4" and $\hat{H}_t$ is a defined matrix of "2×2". "4" is a length of the status vector and "2" is a length of measurement vector. Concretely, value of the matrix is represented as follows.

$$\hat{F}_t = \begin{bmatrix} 1 & 0 & 0 & 0 \\ 0 & 1 & 0 & 0 \\ 0 & 0 & 1 & 1 \\ 0 & 0 & 0 & 1 \end{bmatrix} \quad (31)$$

$$\hat{H}_t = \begin{bmatrix} 1 & 0 & 0 & 0 \\ 0 & 1 & 0 & 0 \end{bmatrix} \quad (32)$$

Figure 8:
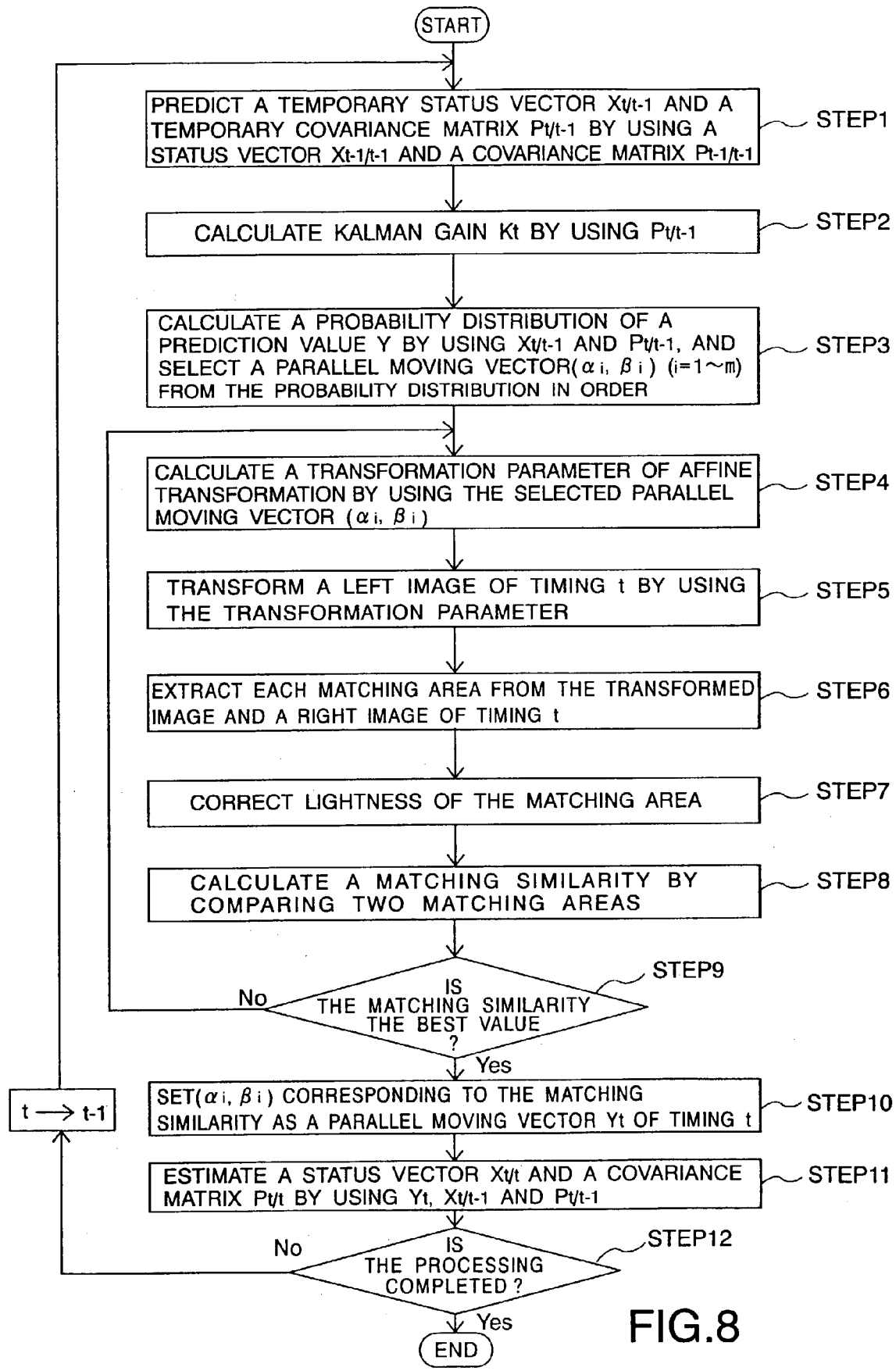
FIG. 8 is a flow chart of estimation processing of a status vector and a covariance matrix according to one embodiment of the present invention.

(6-6) Estimation Step of the Status Vector and the Covariance Matrix:

The estimation step of the status vector and the covariance matrix of timing (t) using the Kalman filter is explained. FIG. 8 is a flow chart of estimation processing of the status vector and the covariance matrix according to one embodiment of the present invention.

(Step 1)

Assume that a status vector "$X_{t-1/t-1}$" of timing (t−1) and a covariance matrix $P_{t-1/t-1}$ of timing (t−1) are stored in the status memory 6. In the status prediction unit 7, a temporary status vector $X_{t/t-1}$ and a temporary covariance matrix $P_{t/t-1}$ are calculated by using the status vector $X_{t-1/t-1}$ and the covariance matrix $P_{t-1/t-1}$. The temporary status vector $X_{t/t-1}$ and the temporary covariance matrix $P_{t/t-1}$ are predicted status information of the vehicle of timing (t) (also referred to as the next timing). This prediction is executed using the expressions (25) and (28).

(Step 2)

In the status prediction unit 7, a Kalman gain of timing (t) (next timing) is calculated by using the expression (27). In this case, the temporary covariance matrix $P_{t/t-1}$ is utilized (Step 3)

In the image transformation unit 3, a prediction value $Y_{t/t-1}$ is calculated by using the temporary status vector $X_{t/t-1}$ and the expression (24). A covariance matrix $P_t$ is calculated by using the temporary status covariance matrix $P_{t/t-1}$ and the expression (29). Additionally, a probability distribution is calculated by using the prediction value $Y_{t/t-1}$, the covariance matrix $P_t$ and the expression (14). Then, a parallel moving vector "$g_i = (\alpha_i, \beta_i)$ (i=1~n)" is selected from candidate values of the probability distribution in order as a candidate (parallel moving vector). For example, "$g_i$" may be selected at random from the candidate values of the probability distribution or selected at equal probability from the candidate values of the probability distribution.

(Step 4)

In the image transformation unit 3, a transformation parameter of affine transformation is calculated by using the selected parallel moving vector ($\alpha$, $\beta$) and the expression (7). Briefly, the transformation parameter is created for each parallel moving vector selected in order.

(Step 5)

In the image transformation unit 3, the left image of timing (t) is transformed by using the transformation parameter. Briefly, the left image is transformed based on a view point of the right side camera (the right image).

(Step 6) In the image matching unit 4, a matching area is extracted from the transformed left image and the right image of timing (t).

(Step 7)

In the image matching unit 4, brightness of the matching area is corrected by using the expression (13). Concretely, a correction method is determined by a difference of the photographic condition between the left image and the right image.

(Step 8) In the image matching unit 4, the transformed left image of timing (t) is compared (matched) with the right image of timing (t). In this case, one method of above-mentioned four matching methods is used. Then, a matching similarity of timing (t) is calculated.

(Step 9)

The processing of steps 4~8 are repeated for each of the selected parallel moving vectors in order. The best matching similarity of timing (t) is selected from each of the calculated matching similarities. Concretely, the matching evaluation value of the minimum is selected as the best matching similarity.

(Step 10)

The parallel moving vector ($\alpha$, $\beta$) used for the transformed left image of the best matching similarity is set as a parallel moving vector $Y_t$ of timing (t)

(Step 11)

In the status estimation unit 5, a status vector $X_{t/t}$ of timing (t) and a covariance matrix $P_{t/t}$ of timing (t) are estimated by using the parallel moving vector $Y_t$, the temporary status vector $X_{t/t-1}$ and the temporary covariance matrix $P_{t/t-1}$. In this case, the expressions (26) and (29) are used.

(Step 12)

The processing of steps 1~11 are repeated for each timing. In this way, the status vector $X_{t/t}$ and the covariance matrix $P_{t/t}$ are updately calculated at each timing.

(6-7) Estimation of the Road Plane:

Next, estimation of the road plane is explained. As mentioned-above at the expressions (9) and (13), if a tilt of the road plane changes, in the image phtographed by the camera, a matching point between the left image and the right image (calculated by the image matching unit 4) is parallely moving along a straight line as shown in FIG. 4. The status memory 6 stores information to estimate the parallel moving vector of the matching point. The tilt of the road plane can be calculated by using information stored in the status memory 6.

Assume that a tilt of the road plane is B and a moving vector of the matching point is $(B \times h_{13}, B \times h_{23})$ by using the expression (9). In this case, "$h_{13}$" and "$h_{23}$" are variables used in the expression (8) for a coordinate of tilted road plane and a projected coordinate. A calculation method of "$h_{13}$" and "$h_{23}$" is explained.

Figure 9:
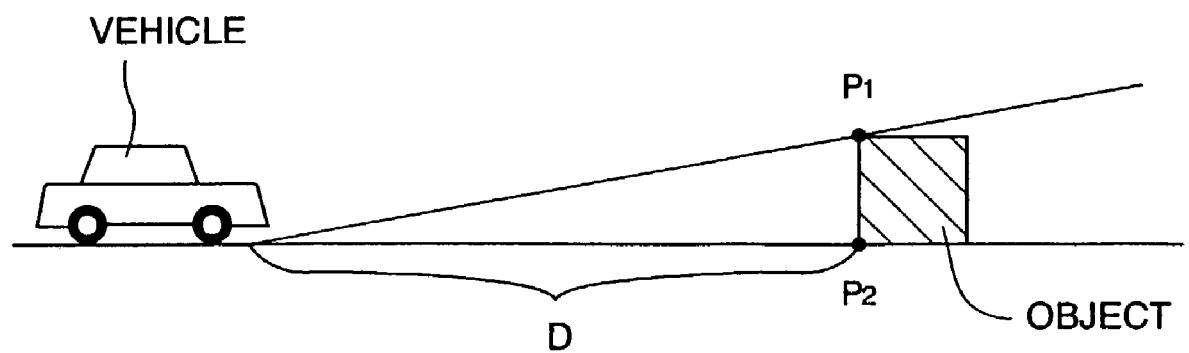
FIG. 9 is a schematic diagram of calculation of coefficient value necessary for estimating a tilt of the road plane according to one embodiment of the present invention.

As shown in FIG. 9, a vehicle is located on a flat road, an object of predetermined height is located at a front distance D from the vehicle on the road, and a camera loaded on the vehicle photographs the object. Assume that the upper end P1 of the object is a coordinate on the tilted road plane and the lower end P2 of the object is a coordinate on the flat road plane. By comparing the coordinate $P_1$ with the coordinate $P_2$, the variable "$h_{13}$" and "$h_{23}$" of the expression (8) are calculated. Other variables in the expression (8), i.e., variables in the expression (3), are also calculated. For example, the camera loaded on the vehicle photographs a plurality of feature points, each of which coordinate is predetermined on the road. By using a correspondence between a coordinate on the image and a coordinate on the road for each feature point, these variables can be calculated.

The "$h_{13}$" and "$h_{23}$" are values representing moving direction of a vanishing point based on tilt of the road. As shown in the expression (13-B), these values are represented as $\vec{d}_l$ for the left side camera (left image) and represented as $\vec{d}_r$ for the right side camera (right image). As shown in FIG. 2, the left side camera and the right side camera are loaded on the vehicle so that two optical axes are almost parallel. Accordingly, if it is assumed that "$\vec{d}_l = \vec{d}_r$", the change in quantity "$\vec{d}_r - A\vec{d}_l$" by tilt of the road in affine transformation between two (left and right) images is calculated from the expression (13-B). As each initial value of the status vector, a vector "$\vec{d}_r - A\vec{d}_l$" of which length is normalized by "1" is set as the initial value of "$(C_x, C_y)^T$". Initial values of other element (l, a) of the status vector are set as "(0, 0)". These initial values are previously stored in the status memory 6.

As mentioned-above, the status memory 6 stores the unit vector "$(C_x, C_y)$" of parallel moving direction of timing (t) and the parallel moving quantity "l". Accordingly, tilt B of the road of timing (t) is calculated by using these values as follows.

$$B = l \times \mathrm{sqrt}(C_x^2 + C_y^2)/\mathrm{sqrt}(h_{13}^2 + h_{33}^2) \quad (33)$$

In the present invention, the status information is estimated by using the parallel moving vector at each timing. Accordingly, when the vehicle travels on the road of ups and downs, when a loading condition of persons or a carrying condition of baggage onto the vehicle changes, or when the vehicle vibrates or the road tilts (i.e., in case that tilt of the road plane changes from a view point of the camera loaded on the vehicle), the status information of the vehicle can be certainly estimated. As a result, the transformation parameter can be correctly calculated by using the status information.

Furthermore, a suitable parallel moving vector is selected from a plurality of parallel moving vectors by using a Kalman filter and the probability distribution. Accordingly, a calculation for selecting of the suitable parallel moving vector can be effectively executed.

Furthermore, the road plane is estimated by using the status information calculated and updated at each timing. Accordingly, the tilt of the road plane is correctly calculated irrespective of existence of white line on the road plane.

For embodiments of the present invention, the processing of the present invention can be accomplished by computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (Operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An image processing apparatus for transforming an input image from a first camera by using a parameter of affine transformation based on a position of a second camera, comprising:
   a status prediction unit configured to predict a temporary status information of the vehicle of timing (t) by using a status information of the vehicle of timing (t−1);
   a parallel moving vector estimation unit configured to estimate a parallel moving vector of timing (t) included in the parameter of affine transformation by using a first camera input image of timing (t), a second camera input image of timing (t), and the temporary status information; and
   a status estimation unit configured to estimate a status information of the vehicle of timing (t) by using the parallel moving vector and the temporary status information of the vehicle of timing (t).

2. The image processing apparatus according to claim 1, wherein the first camera and the second camera, respectively, have a different view position each of which projecting an optical axis onto the road plane that is almost parallel to a moving direction of the vehicle.

3. The image processing apparatus according to claim 2, wherein the first camera input image and the second camera input image, respectively, represents the road plane along the moving direction of the vehicle.

4. The image processing apparatus according to claim 3, wherein the first camera is one of a right side camera and a left side camera loaded on the vehicle, and the second camera is the other of the right side camera and the left side camera.

5. The image processing apparatus according to claim 1, further comprising a status memory being configured to store initial values of a status vector and a covariance matrix of each element of the status vector, the initial values being calculated by calibration of the first camera and the second camera loaded onto the vehicle.

6. The image processing apparatus according to claim 5, wherein said status prediction unit predicts a temporary status vector of timing (t) and a temporary covariance matrix of timing (t) by using the initial values of the status vector and the covariance matrix stored in said status memory.

7. The image processing apparatus according to claim 6, wherein said status prediction unit calculates a Kalman gain of timing (t) by using the temporary covariance matrix of timing (t).

8. The image processing apparatus according to claim 7, wherein said parallel moving vector estimation unit includes an image transformation unit being configured to calculate a prediction value of the parallel moving vector of timing (t) by using the temporary status vector of timing (t), and to calculate a probability distribution of the prediction value by using the temporary covariance matrix of timing (t) and the prediction value of the parallel moving vector of timing (t).

9. The image processing apparatus according to claim 8, wherein said image transformation unit selects a candidate parallel moving vector from candidate values based on the probability distribution in an order, calculates the parameter of affine transformation based on a view position of the second camera by using the selected candidate parallel moving vector, and transforms the first camera input image of timing (t) by using the parameter of affine transformation.

10. The image processing apparatus according to claim 9, wherein said parallel moving vector estimation unit includes an image matching unit being configured to extract a matching area from the transformed image and the second input image of timing (t), the matching area being almost part of a road area based on one from the group of intensity and texture, and to correct brightness of two matching areas.

11. The image processing apparatus according to claim 10, wherein said image matching unit calculates a matching similarity by comparing the matching area from the transformed image and the second input image of timing (t), and sets the parallel moving vector used for the transformed image of which the matching similarity is at least a preferred value as the parallel moving vector of timing (t).

12. The image processing apparatus according to claim 11, wherein, if the matching similarity is not the at least the preferred value, said image matching unit repeatedly calculates the matching similarity by comparing a matching area of a transformed image based on a next parallel moving vector with the matching area of the input image from the second camera.

13. The image processing apparatus according to claim 12, wherein said status estimation unit estimates a status vector of timing (t) and a covariance matrix of timing (t) by using the parallel moving vector of timing (t), the temporary status vector of timing (t) and the temporary covariance matrix of timing (t).

14. The image processing apparatus according to claim 13, wherein said status estimation unit calculates the status vector of timing (t) and the covariance matrix of timing (t) in accordance with a Kalman filter including the Kalman gain of next timing.

15. The image processing apparatus according to claim 13, wherein said status memory stores the status vector of timing (t) and the covariance matrix of timing (t) in place of previous values of the status vector and the covariance matrix.

16. The image processing apparatus according to claim 15, wherein, whenever said status memory newly stores the status vector of next timing and the covariance matrix of next timing, said status prediction unit, said parallel moving vector estimation unit and said status estimation unit, recursively execute respective processing.

17. The image processing apparatus according to claim 16, wherein said status memory updates the status vector and the covariance matrix stored in said status memory at each timing.

18. The image processing apparatus according to claim 17, further comprising a road plane estimation unit being configured to calculate a tilt of a road plane using the status vector stored in said status memory at each timing.

19. An image processing method for transforming an input image from a first camera by using a parameter of affine transformation based on a position of a second camera, comprising:
- predicting a temporary status information of the vehicle of timing (t) by using a status information of the vehicle of timing (t−1);
- estimating a parallel moving vector of timing t included in the parameter of affine transformation by a first camera input image of timing (t), a second camera input image of timing (t), and the temporary status information; and
- estimating a status information of the vehicle of timing (t) by using the parallel moving vector and the temporary status information of the vehicle of timing (t).

20. A computer program product, comprising:
- a computer readable medium storing a computer program for causing a computer to transform an input image from a first camera by using a parameter of affine transformation based on a position of a second camera, said computer program comprising:
  - a first program code to predict a temporary status information of the vehicle of timing (t) by using a status information of the vehicle of timing (t−1);
  - a second program code to estimate a parallel moving vector of timing (t) included in the parameter of affine transformation by using a first camera input image of timing (t), a second camera input image of timing (t), and the temporary status information; and
  - a third program code to estimate a status information of the vehicle of timing (t) by using the parallel moving vector and the temporary status information of the vehicle of timing (t).

* * * * *